8543X
T. Potter, Sr.
Balance Scales.
Patented Dec. 17, 1834.
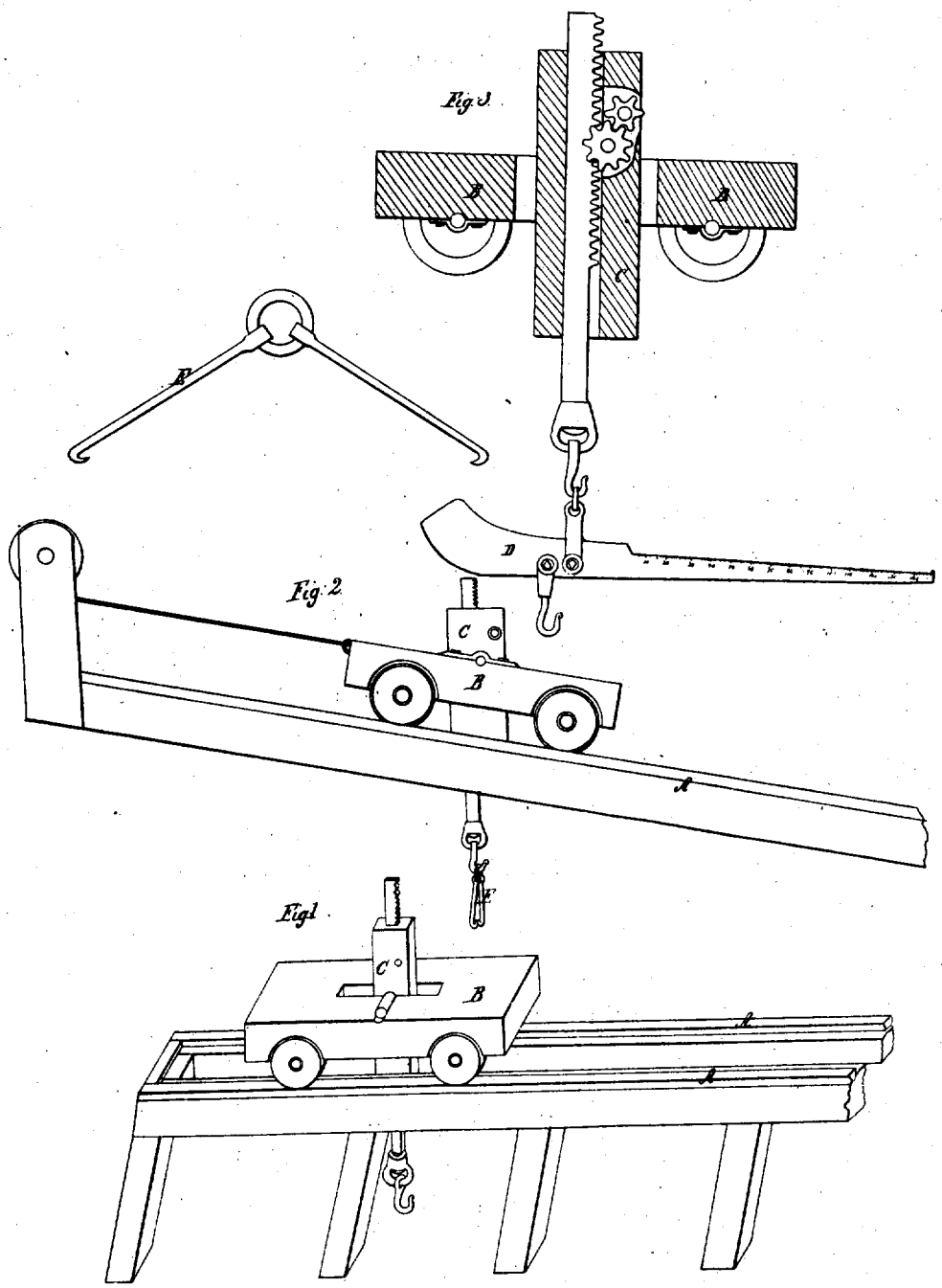

15 Dec 17. 1834 179.

Thomas. Potter Sen.r of the County of Warren, Kentucky.

Letters Patent.

8543X

The schedule referred to in these letters Patent and making part of the same containing a description in the words of the said Thomas Potter Sen.r himself of his improvement in a machine for removing weights from place to place & for loading and unloading Boats warehouses &c.

To all to whom these presents shall come;

Be it known that I Thomas Potter Sen.r of the County of Warren and State of Kentucky, have invented a new and useful improvement in Mechanism to wit — A machine or engine for removing weights from place to place & for loading & unloading Boats Warehouses &c. &c. and that the following is a full and exact description of the construction and operation of the said Machine or engine as invented or improved by Me, —

Beams of strong timber or other material 55 feet in length, more or less, and a foot square more or less, are to be procured. if 55 or more feet in length is desired, the timber may be splised so as to consist of more than a single beam These beams are to be elevated to any height desired, and are to be supported by strong posts, standing perpendicular or otherwise, and sufficiently numerous to prevent the beams from swagging and the rows of posts at bottom, to be 8 feet apart, more or less, the two beams are to be precisely horizontal & parallel with each other, and may be placed at any desirable distance apart, say one foot more or less. The ends of these beams, are to be connected together by strong timbers or other material, so as to cause the beams to retain their parallel position From the upper outside of these beams, there is to be raised perpendicular side rails composed of timbers or other suitable material, three inches thick, more or less, these side rails are to be connected at their ends by rails of equal height On the upper sides of these beams, are to be laid iron or steel rails or plates to extend from one end to the other, two inches in breadth, more or less. A car is to be constructed of 4 wheels 10 inches, more or less in diameter of cast iron or other suitable material and with or without flanges, and the wheels of the mac. to be Drawing see class of Balances 190 8543X suitable weadth to run on the rails or plates aforesaid, If the wheels are made
without flanges, then the car is to be kept to its proper place and made to run
on the rails or plates by means of horizontal friction wheels placed in the car, so
that their pariphery will just bear against the side rails which must be of
such height as will allow the friction wheels of the car to come in contact with
them, The axletrees of the cars are to be of iron or other suitable material
2 inches in diameter, more or less, and are to be let into a block 6 feet in length
more or less and 2½ feet wide, more or less, into which block mortices are sunk
to let the wheels revolve freely around the axletrees according to the model
herewith sent, thro the center of this block which constitutes the Car, a
hole is to be morticed 18 inches in length more or less, & 8 wide more or less,
on the top of the block suitable notches on each side of the mortice are to be
cut, for the Elevator to rest in. The elevator is an instrument made like a
common jack screw the bar of which is to be ten feet long, more or less, and
is to pass down thro the hole morticed in the center of the block, and thro
the opening left between the parallel beams. At the end of the bar there is
to be a swivel to which a scale or grapples is attached so that the scale
may be turned around as convenience may dictate, The scale or grapples
in lieu of the scale is to receive the weight intended to be moved, whatever
it may be. It is then to be raised by turning the levers which work the
elevating bar, and then carried to the place desired by moving the car
on the rails. The weight to be moved is to swing below the car and rails
Instead of an elevator constructed upon the principle of the jack screw
if found to be more convenient, a system of pullies may be used by at-
taching them to the car, or in place of the pullies, the wheel and axle
or windlass may be used, and whether the one or the other is used the weight
is to be elevated so as to swing under the car and rails and then to be moved
to the place desired, by moving the car on the rails. The beams and rails
thereon may not be horizontal and still they will, by means of the car to run
on them as aforesaid, and the elevator be very useful in performing the same
services which are contemplated to be performed when precisely horizontal
when the beams make an angle with the horizon, the car may be made
to ascend by means of a windlass attached to either end of the beams
and

8543 X 191 a rope or chain connecting or attaching the car to the windlass I design using the forgoing machine or engine for the following purposes, First in loading or unloading boats, ships, and water craft of every kind, the model to be sent shows a projection of seven feet over each end of a boat from which it is apparent that a load of rock, or heavy material of any kind may be taken in at one end, put out at the other & placed conveniently in any part of the boat, such a boat and machine attached would be very useful in building Mill Dams removing rock on water courses &c. &c.

Second in transporting heavy articles of merchandize and produce from warehouses to warves and from warves to warehouses, This is to be done by constructing a stationary way by beams placed horizontally or at an angle with the horizon on posts let into the ground as already described, Third, In transporting heavy burdens of all kinds and descriptions, by erecting permanent or temporary ways as aforesaid, and to be used in removing rock earth, wood, logs, minerals, and every conceivable article from place to place The machine for these purposes will be useful in removing rock, and dirt from cellars, supplying saw mills with saw logs, & for all other purposes where it is desirable to remove heavy weights with ease and convenience My invention chiefly consists in the construction of a way for transporting heavy weights in such manner as to allow the weight transported to swing below the way on which the car is to moved to which car the weight is to be attached as already described. The invention may be denominated the elevating and transporting rail way or engine.

Witness
Jas. R. Stiles
Jon.a Hibson

Thomas Porter, Senior.

Drawing

Ex.d
C.L.W.

1290 n.b.